United States Patent [19]
Appleby et al.

[11] 3,779,834
[45] Dec. 18, 1973

[54] TIRE BUILDING MACHINE

[75] Inventors: Paul E. Appleby, Cuyahoga Falls; Robert S. Riggs, Stow; Christopher E. Christie, Akron, all of Ohio

[73] Assignee: The Goodyear Tire & Rubber Company, Akron, Ohio

[22] Filed: June 21, 1971

[21] Appl. No.: 155,208

Related U.S. Application Data

[63] Continuation of Ser. No. 832,272, June 11, 1969, abandoned.

[52] U.S. Cl. .............. 156/405, 156/130, 156/229, 156/259, 156/420, 156/495, 156/510, 156/513
[51] Int. Cl. .............. B29h 17/10, B29h 17/37
[58] Field of Search .............. 156/405, 406, 495, 156/229, 259, 128, 129, 130, 411, 408, 420

[56] References Cited
UNITED STATES PATENTS

| | | | |
|---|---|---|---|
| 1,555,196 | 9/1925 | Freeman | 156/408 X |
| 1,548,156 | 8/1925 | Mixsell | 156/404 |
| 1,522,641 | 1/1925 | McClenathen | 156/404 |
| 3,455,764 | 7/1969 | Bryant | 156/405 |
| 3,057,397 | 10/1962 | Riddle et al. | 156/405 |
| 3,071,179 | 1/1963 | Tourtellotte et al. | 156/405 |
| 3,223,573 | 12/1965 | Deist | 156/405 |
| 3,580,781 | 5/1971 | Hollis et al. | 156/405 |
| 1,246,488 | 11/1917 | Swartz | 156/408 X |
| 1,183,552 | 5/1916 | Gammeter et al. | 156/408 X |
| 3,523,854 | 8/1970 | Cantarutti | 156/397 |

Primary Examiner—Clifton B. Cosby
Attorney—F. W. Brunner et al.

[57] ABSTRACT

A mill for forming a thin sheet of a curable elastomer and a tire carcass receiving drum are combined in apparatus including a conveyor spaced from the mill and engageable with a tire carcass on the drum so as to rotate the drum and wind thereon a continuous plurality of convolutions of the sheet. Slitters located in a space traversed by the sheet between the mill and the conveyor and controlled by a profiling device to be movable in timed relation to the rotation of the carcass vary the width or widths of the sheet portion applied while a second conveyor diverts remaining portions of the sheet from the first conveyor for return to the mill.

6 Claims, 6 Drawing Figures

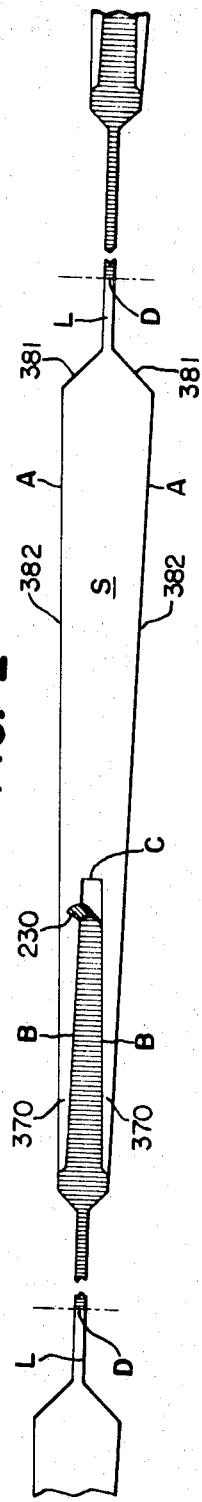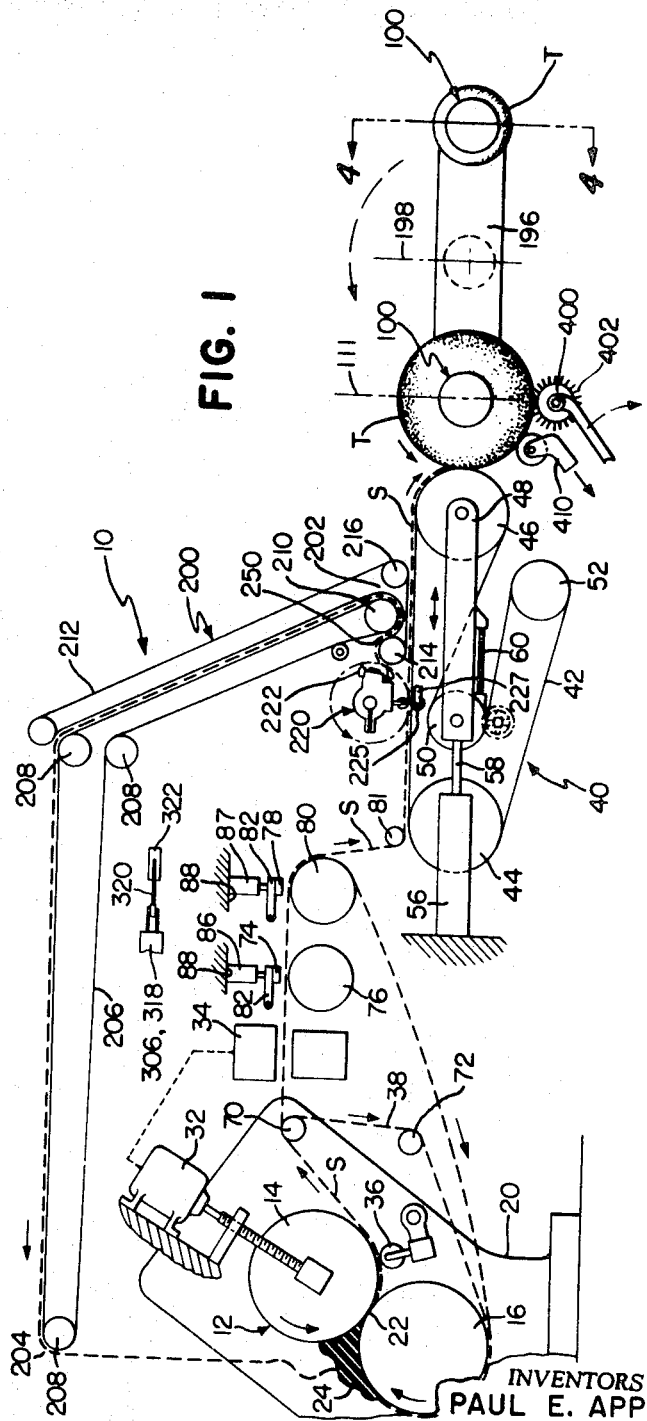

INVENTORS
PAUL E. APPLEBY
ROBERT S. RIGGS
CHRISTOPHER E. CHRISTIE

AGENT

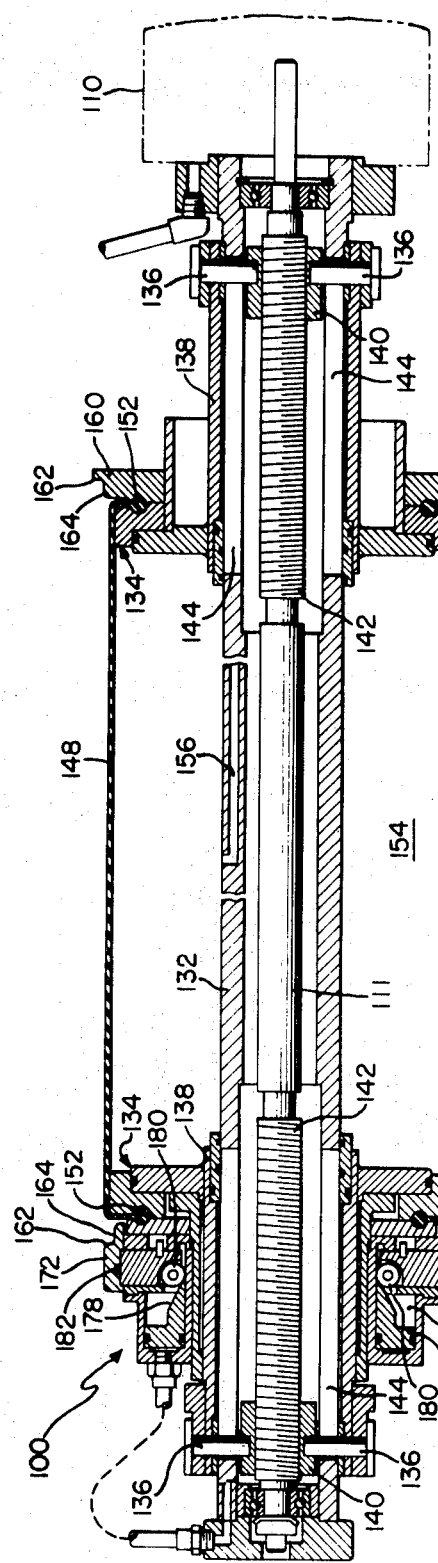
FIG. 4
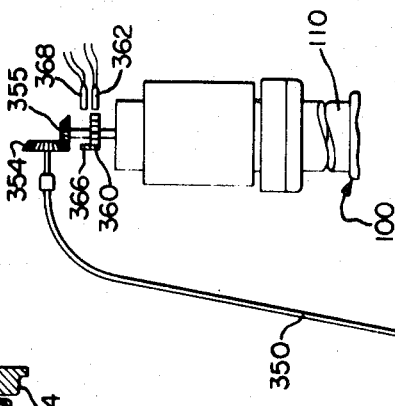
FIG. 6
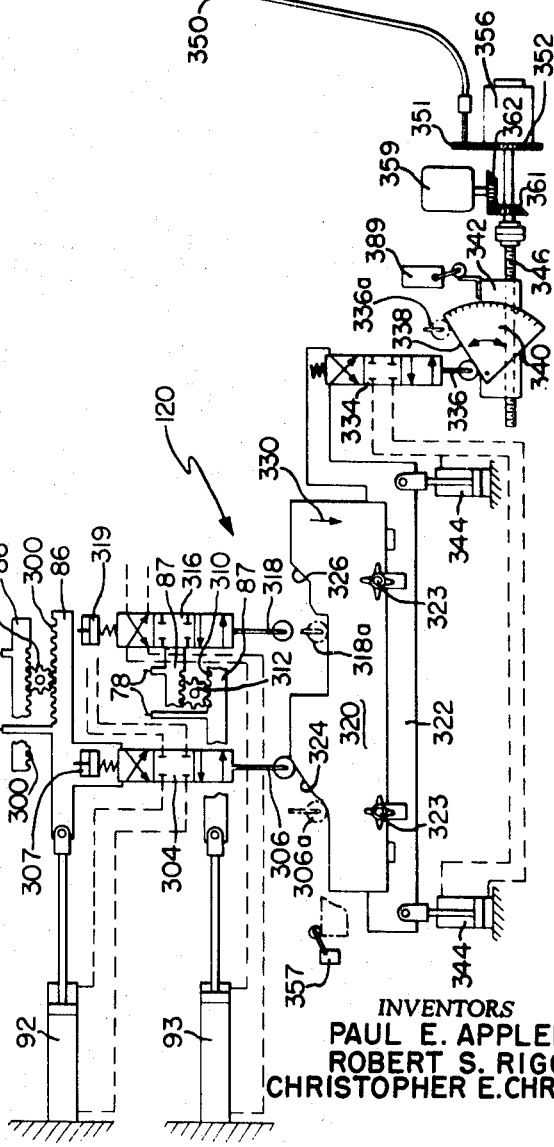
INVENTORS
PAUL E. APPLEBY
ROBERT S. RIGGS
CHRISTOPHER E. CHRISTIE
AGENT

INVENTORS
PAUL E. APPLEBY
ROBERT S. RIGGS
CHRISTOPHER E. CHRISTIE

AGENT

TIRE BUILDING MACHINE

This application is a continuation of our prior copending application Ser. No. 832,272, filed June 11, 1969, now abandoned.

The foregoing abstract is not to be taken as limiting the invention of this application, and in order to understand the full nature and extent of the technical disclosure of this application, reference must be made to the accompanying drawings and the following detailed description.

The present invention relates to the manufacture of tires, and particularly to the application to a tire carcass of a continuous plurality of convolutions of relatively thin sheet rubber material to form a tread portion of a tire.

It is a principal object of the present invention to provide a method and apparatus capable of applying a continuous plurality of turns or convolutions of relatively thin sheet material circumferentially about a tire carcass and to avoid difficulties associated with the conventional manufacture of tires in which a single circumferential length of extruded rubber, sometimes called camelback, is applied to a tire carcass, the ends of the single strip being united in a single transverse splice or joint.

Another object of the invention is to provide apparatus capable of applying a tread in the manner described to a tire carcass which is either in a flat cylindrical form or in a toroidally shaped form, including in the latter case a carcass shaped to receive a relatively inextensible belt circumferentially about the carcass and between the carcass and the tread.

A further object of the invention is to provide apparatus having space between a sheet producing means or calender and the mounting means upon which a sheet is wound about a tire carcass which space accommodates the functions of slitting, cutting off, and guiding of the sheet accurately, for more precise weight or thickness control by the use of a thickness gage such as a Beta Ray gage or equivalent measuring device, and in which space the freshly milled sheet is permitted to attain temperature and dimensional stability.

Yet another object of the invention is to provide a tread built up of relatively thin sheet material, the width or widths of which is or are steplessly varied throughout the angular displacement of the drum about its axis to attain uniform distribution of the weight of the tread and rotational balance in the completed tire.

Yet another object of the invention is to provide apparatus capable of producing tire treads without recourse to the expensive equipment and extensive handling required in the methods of the prior art.

Further objects and advantages of the invention will become apparent or be particularly pointed out as the description of a particular embodiment of the invention proceeds, making reference to the attached drawings in which:

FIG. 1 is a schematic view in elevation of apparatus in accordance with the invention;

FIG. 2 illustrates, developed into planar form, a sheet of material as wound upon a tire carcass by apparatus of FIG. 1;

FIG. 4 is an axial cross-section of a tire carcass mounting means for apparatus of FIG. 1 shown generally as indicated by the line 4—4 in FIG. 1;

FIG. 6 is a schematic diagram of control means of the apparatus of FIG. 1.

Figure 3:
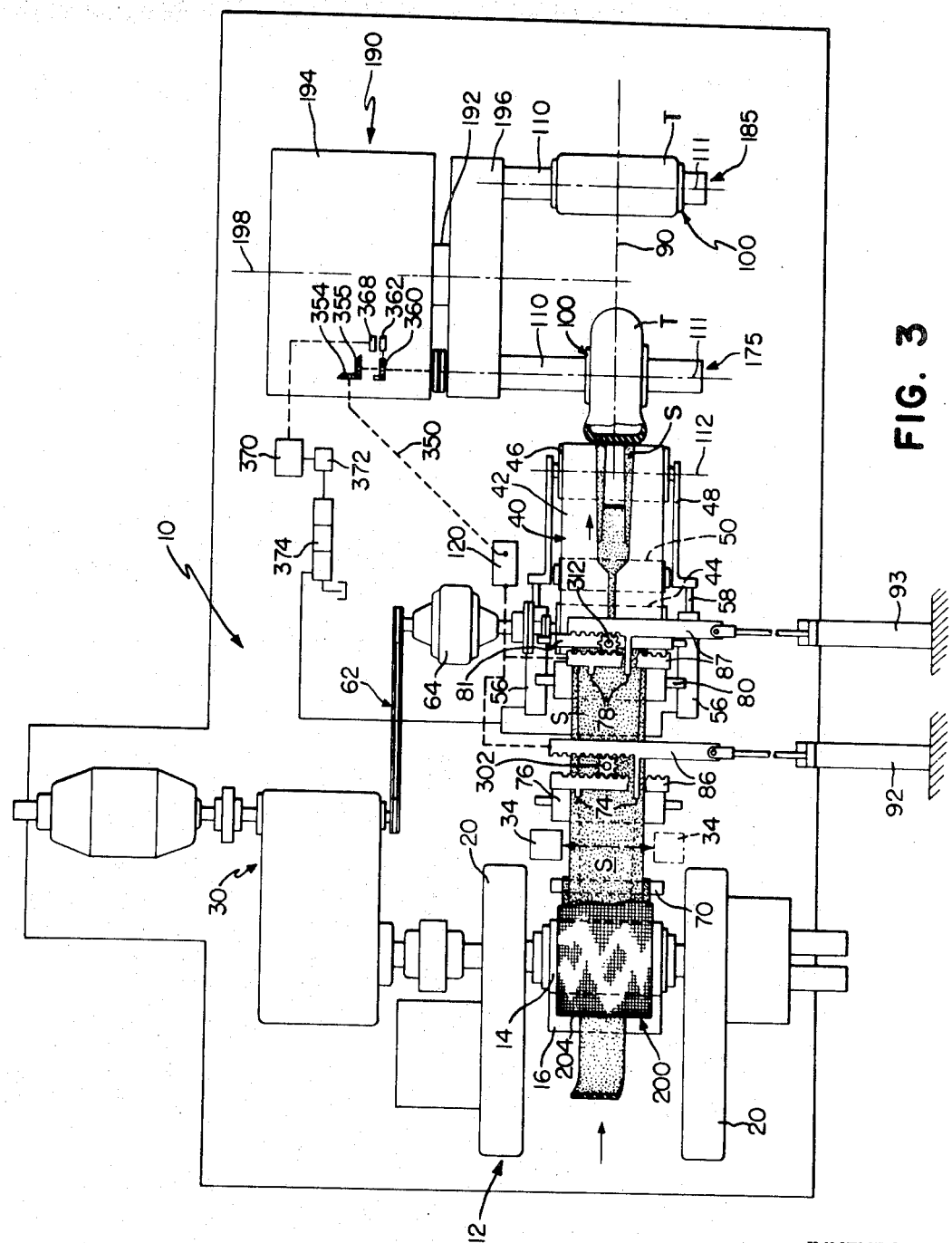
FIG. 3 is a schematic view in plan of the apparatus of FIG. 1.

Referring now to the drawings, particularly FIGS. 1 and 3, an apparatus 10 according to the invention includes a mill or calender 12 having at least two generally cylindrical rolls 14, 16 rotatably mounted in suitable side frames 20, the rotational axes of the respective rolls being parallel and precisely adjustable toward and away from each other in order to form a nip 22 between the rolls and to deliver from the nip a continuous sheet S of rubber or like material suitable for application to a tire carcass to form a tread portion thereon.

The mill 12 is supplied with the desired rubber composition from suitable means such as a tuber or extruder (not shown).

The mill 12 operates to form a continuous running length of thin sheet S of a constant thickness, as determined by the adjustment of the nip 22, from a bank 24 of stock maintained in the valley between the rolls 14, 16 and ahead of the nip 22. The sheet is carried from the nip on the surface of the upper roll 14 and through a span or reach of a distance in the direction of travel, or machine direction, sufficient to provide space and time of travel which permits residual stresses in the sheet to decay and dimensional changes resulting from the treatment in the mill to be accommodated. The space provided has the further advantage of enabling the convenient threading up of the continuous sheet and access thereto for thickness measuring means as well as for slitting means which will shortly be described.

The mill is provided with conventional drive means 30 connected to drive the rolls 14, 16 in the usual manner.

Conventional screw-down means 32 for adjustment of the distance between the respective rolls is provided in order to control precisely the space between the rolls and the dimension of the nip. The screw-down means 32 is operable in response to signals generated by thickness measuring means which in the present apparatus is a Beta Ray gage 34 arranged to sense the thickness of the sheet as the gage traverses across the length of span previously referred to.

To provide a constant width of sheet from the mill, a pair of adjustably fixed slitters 36 are suitably mounted from the calender frames 20 to engage and cooperate with the surface of the mill roll 14 on which the sheet is carried and to produce a longitudinal slit at each lateral edge of the moving sheet. The trim or strips 38 disposed laterally outwardly of each slit are recycled into the bank 24 of stock maintained in the valley.

As may be seen particularly in FIG. 1, means, subsequently to be described, for mounting a tire carcass T to receive circumferentially thereabout a continuous plurality of convolutions of the calendered sheet S is disposed at a distance from the calender sufficient to provide the span previously referred to and which distance is in part occupied by means for dividing or slitting the sheet longitudinally into a plurality of continuous portions and to carry at least one of the portions into wrapping engagement with the tire carcass. Spaced from the calender 12 in the direction of travel of the calendered sheet S through the span, means for conveying and for applying at least a portion of the sheet to the carcass are provided by an application conveyor 40 comprising an endless looped flat belt 42 trained about a plurality of pulleys including a drive pulley 44 mounted for rotation about an axis which is fixed with respect to the calender 12 and an application pulley 46 rotatably mounted upon a carriage 48 which is longitudinally reciprocable toward and away from the pulley 44. Movement of the carriage 48 and the pulley 46 toward or away from the drive pulley 44 shortens or lengthens the conveyor 40 and enables the conveyor belt 42 to be selectively engaged or disengaged to the tire carcass T, as will be further described.

An idler roll 50 disposed outside the loop of the belt 42 and about which the belt is wrapped is mounted upon the carriage 48 for movement therewith. A second idler roll 52 is disposed within the belt loop and rotatably mounted on an axis fixed with respect to the drive pulley 44. As may be seen in FIG. 1, the arrangement is such that a suitable tension is maintained in the looped belt 42 as the reciprocable carriage 48 is moved to extend or retract the conveyor 40.

It has been found desirable that the application pulley 46 have a diameter about one-third or more of the diameter of a tire carcass to which the sheet S will be applied, at least with tires of normal conventional sizes adapted for vehicles for ordinary passenger use.

A pair of fluid power cylinders 56 fixed to the apparatus frame (not shown) have their respective piston rods 58 connected to the carriage 48 to provide the reciprocal movement of the carriage toward and away from the tire carcass. Adjustable positive stop means 60 are provided to limit the outward or extending movement of the carriage.

In order that dimensional change occurring in the sheet S, and particularly any change in the length of the sheet in the direction of its travel, can be precisely accommodated and to insure suitable directional control of the moving sheet between the calender and the tire carcass, means for introducing a variable difference in surface speed between the conveyor 40 and the mill 12 is provided in the present apparatus by a power transmission connection 62 including a speed variation device 64 of the type known as a PIV and manufactured by the Link Belt Company of Chicago. The power transmission connection receives power from the drive means 30 driving the calender and delivers its power out-put to the driving roll 44 of the conveyor 40. Appropriate adjustments of the relative surface speeds to suit differences in the behavior of different rubber or rubber-like materials in the apparatus 10 are readily made by an operator while observing the movement of the sheet material S through the apparatus. This feature enables the sheet S to be wound upon the tire carcass with a residual stress in the sheet sufficiently low that the carcass after winding can be removed and carried to subsequent operations, such as curing, without becoming so deformed as to hinder the placement of the carcass into a conventional tire curing press.

So that a continuous plurality of convolutions of the sheet as applied to a tire carcass will combine to form, in the completed tire, a desired cross section shape, slitting means are mounted on the apparatus 10 and positioned to be operative to divide the sheet into a plurality of continuous portions while the sheet travels in and through the span extending between the mill 12 and the conveyor 40. FIG. 2 depicts a representative outline of a sheet as applied to a tire carcass, the total plurality of convolutions having been developed to planar form to illustrate the action of slitting means to be described.

The slitting means comprise a plurality of rolls which cooperate to support a portion of the aforesaid span in a generally horizontal plane. A fly roll 70 receives the sheet from the upper calender roll 14. From the fly roll the trim 38, previously referred to, is turned downward about the lower fly roll 72 and is returned to the supply bank 24 located in the valley between the calender rolls in any convenient manner. The slitting means further comprise a first or outside pair of knives 74 selectively engageable with an anvil roll 76 with which the knives 74 cooperate to produce the longitudinal slits illustrated by the lines designated A in FIG. 2; and a second or inside pair of knives 78 selectively engageable with a second anvil roll 80 with which they cooperate to produce the longitudinal slits illustrated by the lines designated B in FIG. 2. The anvil rolls 76, 80 are driven in timed relation with the driving roll 44 of the conveyor 40 and may, if desired, be provided with suitable connections for warming or cooling the sheet S passing thereover, as may be required by the particular composition of the sheet material. A guide roll 81 is positioned adjacent to the conveyor drive roll 44 to receive the sheet thereunder from the slitting means.

The pairs of slitter knives 74, 78 cooperating with the respective slitting rolls 76, 80 are supported on individual pivotally mounted arms 82 for movement toward and away from the respective roll surfaces and on individual knife carriages 86, 87, which are mounted on guideways 88 fixed to the apparatus 10 for movement transversely thereof toward and away from each other. In the embodiment being described, the individual knife carriages 86, 87 are movable equilaterally with respect to a vertical longitudinal central plane 90 of the apparatus which generally coincides with an equatorial plane of a tire carcass mounted to receive the sheet S from the application conveyor 40. Driving means in the form of fluid motors 92, 93 are connected to move the respective carriages 86, 87 toward and away from the central or equatorial plane 90.

The apparatus 10 includes means mounting a tire carcass for rotation about its own axis to receive therearound a plurality of successive and continuous convolutions of sheet material S from the applicator conveyor 40 which means is provided by the carcass carrying drum 100 mounted upon the spindle 110 to be rotatable about an axis 111 disposed generally horizontally and parallel with the axis 112 of the conveyor applicator roll 46. The rotation of the carcass and of the drum 100 and spindle 110 are positively communicated to means 120 for controlling the lateral positions of the respective knives, which means will be described subsequently herein, and by which means the knives 74, 78 are caused to move transversely of the sheet S in timed relation with the rotation of the tire carcass.

Referring now to FIG. 4, the aforementioned carcass mounting means, in one of the forms contemplated, adapted to shape a tire carcass from its cylindrical form as built into toroidal form and to support the carcass for rotation about its own axis to receive a continuous plurality of said convolutions therearound, is provided by the drum 110 having a central shaft 132 and a pair of heads or end members 134 mounted coaxially on the shaft 132 and movable toward and away from each other. The respective end members are connected by a plurality of dowels 136 secured to extend radially between the hubs 138 of the end members and the nuts 140 threadedly engaged with respective portions of the right and left-hand screw 142 rotatably mounted coaxially within the shaft 132, the dowels extending through longitudinal slots 144 in the wall of the shaft in such a manner that a predetermined rotation of the screw 142 causes correspondingly determined equal and opposite axial movements of the end members.

A cord-reinforced generally cylindrical tubular elastic membrane 148 having reinforcement cords disposed from end-to-end therein generally parallel to the axis 111 of the drum 100 is secured at each of its circular ends 152 to a respectively associated one of the end members 134. The end members are mounted in fluid tight relation with the shaft 132 and, together with the membrane 148, form a chamber 154 into which fluid under pressure may be introduced or released by way of the passage 156 within the wall of the shaft (a portion of the wall including the passage 156 being shown rotated about the axis 111 for clarity). Attached coaxially and outwardly of the end members 134 annular rings 160 and 170 are each provided with a flange 162 and a rigid conical surface 164 and are adapted to engage a respective bead portion of a tire carcass placed upon the drum 100 to retain that bead portion in concentricity with respect to the drum axis 111.

To provide for the mounting of a preformed carcass, having cylindrical form and including relatively inextensible bead rings, over the drum while the latter is in its deflated relatively cylindrical state, the outer annular ring 170 is formed of a plurality radially movable segments 172. Affixed to the hub portion 138 of the outer end member 134 is an annular cylindrically walled chamber 174 mounted coaxially of the drum. An annular piston 176 disposed in the chamber and movable axially therein, in response to fluid pressure introduced into the chamber, is formed with a conical and coaxial hub 178. Each of the radially movable segments 172 is provided with a roller 180 engageable with the conical or slanting surface of the hub 178 so that axial movement of the annular piston 176 produces radial movement of each of the segments. Surrounding the plurality of segments circumferentially a garter band 182 is elastically contractible to return the segments 172 to their minimum or retracted position when the piston 176 is moved axially away from the rollers 180 enabling the bead portions of a tire carcass to be passed over the outer end of the drum. Admission of fluid pressure to the chamber 174 behind the piston causes the latter to move axially, thereby forcing the radial segments to move outwardly to receive in firm engagement and concentricity the respectively associated bead portion of a carcass placed on the drum.

The carcass mounting drum 100, just described, is but one form of drum which can be employed in the apparatus 10. As will now be apparent to persons skilled in the art, other means for supporting a tire carcass, either toroidally shaped or cylindrically shaped, can be used in conjunction with the apparatus.

Reverting to FIGS. 1 and 3, the apparatus further comprehends means for moving the carcass carrying drum 100 between a station 175 or location wherein the convolutions are wound about the carcass and a second location or station 185 where a carcass, having been wound with continuous convolutions of rubber sheet, is removed from the drum and/or a fresh carcass is placed thereon to be wound. As may be seen in FIGS. 1 and 3, means for moving a carcass carrying drum between the respective positions is provided in the present embodiment in the form of a turret assembly 190 having a central cantileverly disposed spindle 192 rotatably supported in a housing 194 and carrying at its outer end, a turret 196 from which are extended a plurality of the spindles 110 disposed parallel to and equidistant from the central axis 198, each of which spindles is adapted to carry carcass receiving drum means of the character herein previously set forth.

The apparatus 10 includes means for diverting a central portion of the continuous sheet from the application conveyor 40, said means being provided herein by a belt conveyor 200 disposed above the application conveyor 40 and extending from a receiving end 202 located intermediate the conveyor rolls 44,46, upwardly of and above the apparatus to a discharge end 204 from which the conveyor 200 can discharge a diverted ribbon or portion of sheet into the bank 24 of rubber stock in the valley between the rolls of the calender 12. The diversion conveyor 200 includes an endless looped belt 206 trained about a plurality of rolls 208 including a lower or receiving end roll 210 and a second endless belt loop 212, a portion of which is trained about a lead roll 214, the roll 210, and a guide roll 216 placed respectively before and after, in the direction of sheet travel, the end roll 210 which so carries both belts 206 and 212.

Figure 5:
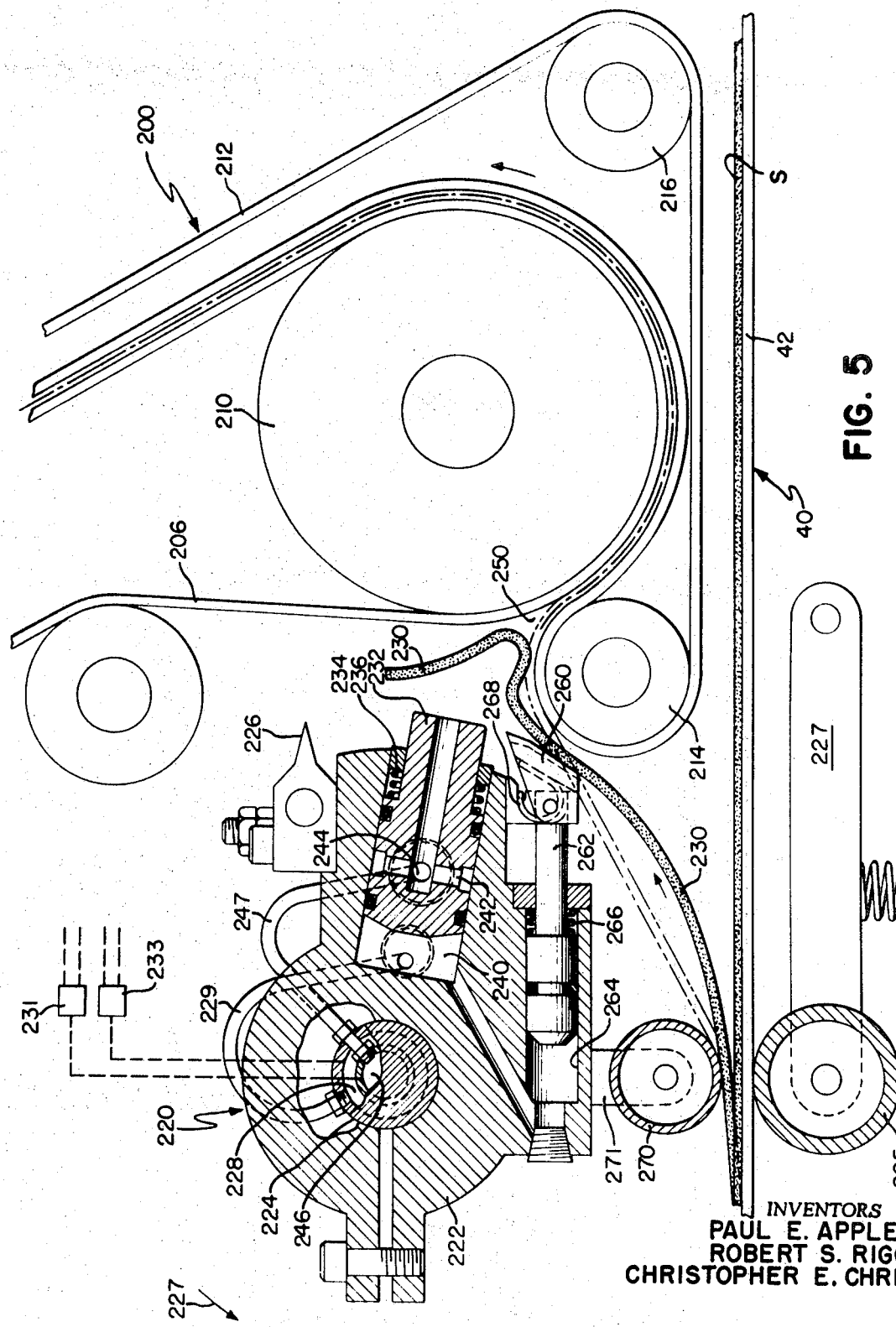
FIG. 5 is an enlarged cross-sectional in elevation view of sheet diverting means of the apparatus of FIG. 1.

To divert or pick up from the application conveyor 40 a ribbon or portion of the sheet S moving thereon, there is located immediately above the application conveyor and in front of the lead roll 214 a diverter head assembly. Referring now to FIG. 5, the diverter head assembly 220 includes a head 222 mounted on a shaft 224 extended across the machine direction and carried on the apparatus for rotation about an axis substantially parallel to the plane of the sheet S. Mounted upon the head is a trans-verse knife 226 adapted to cooperate with the surface of the application conveyor belt 42, and with a backing roll 225 resiliently mounted by swing arms 227, during a single revolution of the head 222 to make a transverse cut in the sheet, as is illustrated at C or D in FIG. 2. The diverter head 222 further includes pick-up and transfer means comprising a plunger 232 received in a cylindrical bore 234 located radially in the head 222 at a small angle behind the knife 226 (referring to the direction of rotation of the head indicated by the arrow 227). The plunger is extended by air pressure, communicated by way of the passage 228 in the shaft 224 and the flexible connecting tube 229, so as to be engageable with the surface of the leading end 230, and is retracted by the spring 236 upon release of the air pressure from the chamber 240. Passages 242 in the plunger communicate, while the plunger is extended as shown, with passages 244,246 in the head and shaft respectively (which are connected by the flexible tube 247) so that during a portion of the rotation of the head, vacuum is applied to assist in picking up the leading end 230. Through the same passages 242, 244,246 the vacuum is succeeded during the rotation of the head 222 by a pulse or jet of air pressure to release and insure the transfer of the moving leading end 230 into the convergence 250 of the belts 206,212.

The effect of the air pulse emitted from the plunger 232 is indicated by the configuration of the end 230, shown in FIG. 5, and is to positively separate the uncured tacky material from the knife 226.

The passages 228 and 246 provided in the shaft 224 are connected by way of a conventional dual passage rotary joint (not shown) to valves 231 and 233, respectively, each of which is adapted to connect selectively to air pressure supply and vacuum means in response to rotational position of the shaft 224.

The head 222 further includes a strip engaging claw 260 which is pivotally mounted at the end of a plunger 262 received in a cylindrical bore 264 in the head 222 and which plunger is also extended from the head, by air pressure introduced in the bore 264, against the force of the return spring 266 acting on the plunger. A spring 268 acting on the pivotally mounted claw 260 permits the claw to engage positively yet resiliently with the strip S as the head 222 is rotated. Upon release of the air pressure both of the plungers 262 and 232 are retracted into the head 222 by the respective return springs. The leading end 230 of the strip is projected into the convergence 250 between the belts 206,212. Either or both of the pick-up and transfer means described may be incorporated in the diverter assembly head 220. The assembly and particularly the head are caused to rotate through a single revolution by a clutch engageable to connect the shaft 224 and the roll 44 for corotation at a peripheral speed about equal to the surface speed of the belt 42 and initiated in response to a predetermined number of revolutions of the carcass T.

The conveyor 200 is preferably driven at a surface speed slightly greater than the surface speed of the conveyor 40. The strip 230 tends thereby to be drawn upwardly with slightly increased tension from the remaining portion of the strip S on the conveyor 40. The roller 270 mounted on the shaft 224 by the arms 271 serves to guide the strip 230 between the belt 42 and the belt 206 and prevent the strip from coming into contact with the head 220. The slight tension provided in the strip 230 tends to reduce the width thereof and thus prevent any readherence of it to the remaining portions of the sheet S on the belt 42.

Referring now to FIG. 6, the previously mentioned means 120 for controlling the lateral positions of the respective knives is shown schematically for clarity of exposition. Each of the individual knife carriages 86 includes a gear rack 300, which racks are oppositely faced and mesh with a single pinion 302 which is mounted for rotation about a fixed axis so that movement in one direction of one of the carriages 86 must result in equal and opposite motion of the other of the carriages 86 and of the knives 74 mounted thereon. The previously mentioned fluid motor 92 is connected at one end of one of the carriages 86. A servo valve 304 is mounted for movement with one of the carriages 86 and is provided with a probe 306 connected with the spool of valve 304 in a manner presently to be described. The valve 304 is spring biased so as to supply fluid pressure to the motor 92 in a direction which tends to move the knives 74 toward one another, except as and when the probe 306 is displaced. A pneumatic override 307, comprising a cylinder for shifting the valve spool of the valve 304 enables the knives 74 to be traversed outwardly so as to facilitate changing of the template to be described.

The inside knives 78 are likewise mounted on individual knife carriages 87 each of which is provided with a gear rack 310, in all significant respects like the rack 300 previously described, and which racks are in mesh with a pinion 312, again, such that motion of one of the carriages 87 occasions an equal but oppositely directed motion of the other carriage 87. The fluid motor 93 is connected to one end of one of the carriages 87 in the same manner as described of the motor 92. A servo valve 316 is mounted on one of the carriages 87 for movement therewith and is provided with a probe 318 connected to displace the spool of valve 316 as will be described shortly. The valve 316 is also spring-biased, except when the probe 318 is displaced, so that fluid pressure is admitted to the motor 93 in a direction tending to move the knives 78 away from one another. The pneumatic override cylinder 319 is connected to shift the valve 316 to return the inside knives 78 toward one another to the position indicated in FIG. 6.

The control means further includes a template 320 which is removably secured to a template carrier 322 by the clamp devices 323, the location and orientation of the carrier being illustrated in FIG. 1. The template includes a first profile 324 which is engageable with the probe 306 and adapted to control the movement of the outside knives 74 to effect thereby generally longitudinal slits in the sheet S, illustrated by the lines designated A in FIG. 2.

The template 320 also includes a second profile 326, which is engageable with the probe 318 and adapted to control the inside knives 78 in a manner to effect the slits, illustrated in FIG. 2 and designated by the lines B.

The template carrier 322 is mounted in the apparatus 10 for movement in directions generally normal or perpendicular to the direction of movement of the knives across the machine. Mounted for movement with the template carrier 322 is a servo valve 334 which valve is provided with a probe 336 engageable with a stock gage cam ramp 338, the slope of which is adjustable, the cam 340 being pivotally attached to cam carrier 342 mounted for movement generally normal to the direction indicated by the arrow 330. The spool of the valve 334 is biased, except as displaced by the probe 336, so as to admit fluid pressure to the cylinders 334 to effect movement of the carrier 322 tending to displace the template 320 in the direction of the arrow 330, away from the valves 304 and 316.

The cam carrier 342 is threadedly engaged with a screw 346. A flexible shaft 350 is suitably connected between a pinion 351 engaging a spur gear 352 mounted corotatably with the screw 346 and a bevel gear 354 driven by a bevel pinion 355 mounted corotatably with the spindle 110. A clutch 356 provides selective engagement or disengagement of the gear 352 and the screw 346.

As will presently appear, the movement of the carrier 322 in a direction opposite that shown by the arrow 330 actuates the limit switch 357 which is connected to engage the clutch 356. The screw 346 is also driven, clutch 356 being disengaged, by a D.C. variable speed reversible reset motor 359, drivingly connected to the screw 346 by the bevel gears 361,363, and by which the template carrier is caused to move independently of the rotation of the drum 100.

Corotatable with the spindle 110 is a counting wheel 360 having a multiplicity of teeth each of which actuates a sensing probe 362 which emits an impulse to a conventional electrical counting circuit (not shown) in response to the movement of individual teeth relative to the probe 362. Operating events of the apparatus such as the rotation of the head 220 are initiated in response to the accumulation of a preselected number of counts in the counting circuit.

Also mounted for corotation with the spindle 110 is a single counter tooth 366 which, once per revolution, actuates a switch 368 which is connected electrically to a pulse timer 370, illustrated in FIG. 3, which pulse timer emits a signal actuating the solenoid 372 of the hydraulic valve 374 so as to retract the roll 46 of the conveyor 40 incrementally by an amount closely approximating the gage or thickness of the sheet being applied to the carcass on the drum 100.

Operation of the apparatus herein described is begun by putting the mill 12 into operation, supplying the valley with a bank 24 of suitable rubber stock from a tuber or mill in conventional manner, and adjusting the spacing or nip 22 between the rolls to produce a sheet of suitable thickness which in the initial stages of operation will adhere to the upper roll 14 and return thereon to the bank until stable operation is achieved whereupon an operator cuts the sheet S on the surface of the roll 14, transfers a leading end portion over the fly roll 70 and returns the leading edge of the moving sheet under the lower roll of the mill or otherwise to return to the supply bank 24. The trimming knives 36 are then engaged to divide a portion of the moving sheet from each edge thereof leaving a central portion of predetermined width which the operator, again cutting a leading edge, transfers through the open span, over the anvil rolls 76,80, returning this portion then beneath the lower roll 16 to the bank through the loop shown in FIG. 1 or by other suitable means. The first or outside pair of knives 74 are then caused to engage the roll 76 and slit the moving strip to divide a central lead portion L which is thereupon passed by the operator beneath the guide rail 81 onto the conveyor 40, and over the roll 214 either manually or by actuating the diverting head assembly 220 to pick up and transfer the portion L into the convergence 250 of the belts 206,212 whereupon the lead L is carried by the diverting conveyor 200 back to the supply bank 24, establishing the path arrangement of the rubber sheet, as illustrated in FIG. 1.

The operator then adjusts the variable speed device 64 to establish a speed difference between the mill 12 and the conveyor 40 such as to accommodate dimensional changes in the sheet which occur due to the milling operation and to produce just sufficient tension in the sheet S to provide stable tracking of the sheet along its path. At this time the Beta Ray gage 34 is traversed across the span of the sheet and the signal out-put from the Beta Ray gage, representing the thickness of the sheet, is communicated to the screw-down means 32 so as precisely to establish the desired thickness of the sheet delivered from the mill. During subsequent operation the gage 34 is periodically traversed to maintain the thickness of the sheet.

A tire carcass T including at least one ply of tire reinforcing fabric in generally cylindrical form, having the end portions of the fabric wrapped about a pair of parallel coaxially spaced apart tire beads, is positioned about the drum 100 in suitable axial registry with respect to the mid-circumferential plane of the tire and the centerline of the sheet material moving in the apparatus.

It is advantageous that the carcass include, in addition to the fabric reinforcing plies, at least one circumferential band of sidewall material affixed about the carcass to cover and to secure each of the ply endings axially inwardly of the beads, the addition of the sidewall material serving to maintain the rotundity of the carcass and thus enhance the handling thereof between a building drum on which the carcass is formed and the mounting drum of the present apparatus.

With the carcass in place upon the drum, the end members 134 thereof are moved toward one another while air under pressure is admitted into the chamber 154 within the tubular membrane 148 and the annular ring movable segments 170 are expanded to receive the bead, the expansion of the membrane due to the air pressure therewithin tending to move the bead portions of the tire carcass axially outward into firm concentric engagement with the respective annular rings 160,170 as the drum and the carcass thereon are expanded into toroidal form.

With the carcass shaped into toroidal form and to a pre-determined diameter at its equatorial plane and a predetermined fixed spacing between its bead portions, the turret 196 is rotated to move the carcass from the loading station 185 into the winding station 175 adjacent the tread applicator roll 46 of the conveyor 40.

The tread applicator roll and the conveyor are extended by application of fluid pressure in the operating cylinders 56 to a predetermined radial distance from the axis 111 of carcass rotation which distance is adjusted by the stop means 60. The tire carcass is radially deflected by an amount sufficient to widen the crown thereof to engage the belt over the full width, or nearly the full width, of the portion of the sheet to be wound thereon.

The diverter knife head 222 is again actuated in a single rotation producing a transverse cut D in the sheet, as illustrated in FIG. 2, the lead L, not in this event being picked up by the diverter plunger 232, continues along the conveyor 40 into the sheet applying nip formed between the conveyor belt 42 moving over the roll 46 and the rotating carcass T.

The lead L applied to the carcass is generally short and generally does not exceed one revolution of the carcass. The reset motor 359 then is energized, driving the screw 346 to move the cam slope 338 against the probe 336 (toward the left in FIG. 6). Displacement of the probe 336 reverses the position of the spool of valve 334 supplying fluid to drive the cylinders 344 outwardly, moving the template 320 so as rapidly to displace the probe 306, reversing valve 304 and so driving the knives 74 outwardly, providing the profile of the sheet S as indicated at 381 in FIG. 2, which may extend in length from a fraction of one revolution of the tire carcass T to as much as two whole revolutions thereof. Movement of the template carrier 322, outwardly oppositely of the direction of the arrow 330 is terminated and the reset motor 359 is deenergized when the carrier 322 actuates the limit switch 357. The counter engagement clutch is engaged so that the knives 74 continue slitting, now gradually approaching one another to effect the gradual narrowing of the sheet as is indicated by the lines 382 of FIG. 2.

At the instant of actuation of the limit switch 357, it will be recalled, the template carrier 322 and the template are extended and knives 74 traversed outwardly so that the probe 306 is in contact with the profile 324 as indicated in phantom outline 306a, while the probe 336 is positioned, relative to the cam 340, as is indicated by the phantom outline 336a and the probe 318 is similarly located with respect to the template profile 326, indicated at 318a.

Responsive to the rotation of the drum 100, the cam 340 now moves toward the right in FIG. 6, to cause the template and carrier 320 gradually to retract in the direction of the arrow 330, the override 319 being released, and the probes 306 and 318 control the lateral position of the respective knives 74 and 78 in response to the particular profiles 324 and 326 respectively.

To maintain the pressure exerted by the application conveyor on the tire carcass as successive convolutions are applied, the revolution counter switch 368 mounted to be actuated at each revolution of the carcass generates an impulse or signal, communicated to the aforementioned counting circuit, in response to which the carriage operating cylinders 56 are retracted an increment approximately equal to the thickness of the sheet being wound on the carcass, as each revolution is completed.

The sheet is initially widened during a predetermined number of revolutions of the carcass and then is progressively reduced in width for a second predetermined number of revolutions at the end of which time the inside knives 78 are again engaged with their associated anvil roll 80 and the diverter head and knife 226 are again actuated to cut at C, FIG. 2, a new central lead 230 and to pick up and transfer the end thereof in this event to the convergence 250 of the diverter conveyor belts 206,212. As will be apparent by inspection of FIG. 2, inside knives are progressively moved gradually as described to widen the center strip 230, thereby producing the progressively narrowing portions 370 of the sheet which wind upon the carcass to form the shoulders of the tread cross-sectional shape while the central lead 230 is being returned to the supply bank by the diverter conveyor 200. Upon completion of a further predetermined number of revolutions, the inside knives 78 are, responding to the step portion of the profile 326, actuated to sever the two shoulder strip portions 370, as may be seen in FIG. 2, and thus the slits effected by the knives 78 intersect the slits produced by the outside knives 74 whereupon the inside knives 78 are disengaged from the roll 80. The outside knives 74 are moved toward each other, again producing the continuing lead strip L as shown, by disengagement of the clutch 356 and energizing the reset motor 359 to move the cam 40 to the position thereof shown in FIG. 6 where the limit switch 389 is actuated. The reset motor 359 is deenergized, the clutch 356 disengaged, the override 319 returns knives 78 to their inward position restoring the system to its initial state, shown in FIG. 6, in readiness to repeat the cycle described.

The passages 228,246 within the shaft 224 are connected by a dual passage rotary union 380 respectively to suitable valves 382,384 which open and close communication respectively with air pressure and with vacuum pumps (not shown) in response to control signals from the counting circuit previously referred to at predetermined revolutions of the carcass transmitted to the circuit from the counter sensing probe 362.

The carcass T is treated by a pricking roll 400 which is rotatably interengaged therewith. The pricking roll is provided with a multiplicity of teeth 402, generally sharp pointed like carpet tacks, which penetrate the convolutions wound upon the carcass to enhance the adherence of one to another of the convolutions. If desired, conventional stitching means may also be employed, such as are illustrated by the stitching roll 410. The pricking roll 400, as well as the stitching roll 410, are mounted respectively on swing arms or the like adapted to move the rolls into operating position engaging or interengaging the carcass T, or to a second position clear of the carcass for movement thereof by the turret.

Upon completion of the winding of the sheet about the carcass for the predetermined total number of revolutions, the turret 196 is again indexed, placing a second carcass into the winding position and placing the completed carcass into the unloading station whereupon it is removed from the mounting drum.

While certain representative embodiments and details have been shown for the purpose of illustrating the invention, it will be apparent to those skilled in this art that various changes and modifications may be made therein without departing from the spirit or scope of the invention.

What is claimed is:

1. Apparatus for applying to the uncured tire carcass portion of a pneumatic tire a continuous plurality of convolutions of homogenous uncured rubbery material to build a tread circumferentially about said carcass; said apparatus comprising first means operable to form continuously a uniformly thin flat sheet of said material; second means including an elastically expandable carcass shaping drum spaced apart from said first means and operable to mount and to expand an uncured tire carcass from its cylindrical to its toroidal form and for rotation about an axis common to said drum and said carcass to receive said convolutions thereonto from said first means; said axis containing the geometric centers of the circular bead rings contained in said carcass; third means spaced apart from said first means and including a movable conveying surface disposed between said first and said second means to receive said sheet from said first means and to carry at least a portion of said sheet in undistorted thin flat form into carcass deflecting engagement with said carcass while causing rotation of said carcass; slitting means disposed between and apart from said first and said third means to taper controllably the lateral width of said portion of said sheet; and drive means drivingly connected to and between said first and said third means and capable of effecting a difference between the linear surface speeds of said portion of said sheet being so carried in the principal direction of movement of said sheet while the same is being engaged and moved by one of said first and said third means, with respect to the linear surface speed of such movement of said sheet being engaged and moved by the other of said first and third means; said drive means including means for steplessly varying said difference, whereby change in the length of said sheet due to elastic recovery and relaxation of the internal stresses induced during formation thereof by said first means can be accommodated.

2. Apparatus as claimed in claim 1 including slitting means comprising a pair of rolls arranged to support said sheet in its travel through space between said first and said third means, a pair of slitting knives respectively engageable with each of said rolls, said knives being operable to divide said sheet longitudinally into a plurality of continuous portions at least one of which is applied to said carcass by said conveying means.

3. Apparatus as claimed in claim 2, said conveying means comprising a frame, a plurality of belt-engaging rolls rotatably carried by said frame, an endless looped belt in wrapping engagement with said rolls for travel therearound, at least one of said rolls being in fixed spaced relation with respect to said first means, at least one other of said rolls being mounted for movement toward and away from said second means, and means for effecting a pressure engagement between the movable one of said rolls and said tire carcass.

4. Apparatus as claimed in claim 3, including means for moving said knives equilaterally with respect to the plane containing the mid-circumferential line of said carcass and operable in steplessly continuously timed relation to rotation of said carcass.

5. Apparatus as claimed in claim 3, further including means for moving said slitting means toward and away from each other and respectively toward and away from a plane containing the mid-circumferential line of said carcass gradually and continuously in timed rotational relation with said carcass.

6. Apparatus as claimed in claim 1, said third means comprising conveying means including an endless looped belt disposed between said first means and said second means for conveying at least a portion of said sheet extending therebetween and into said engagement, said third means being spaced sufficiently apart from said first means to provide free access to said sheet as the same travels between said first means and said third means, and means providing movement of one of said conveying means and said second means toward the other thereof to bring said second means and said conveying means into cooperative sheet winding relation with said sheet in continuous pressure engagement with said carcass.

* * * * *